United States Patent
Kitaura

[15] 3,681,586
[45] Aug. 1, 1972

[54] PRODUCT/QUOTIENT DERIVING SYSTEM

[72] Inventor: Kouichi Kitaura, Kobe, Japan

[73] Assignee: Mitsubishi Denki Kabushiki Kaisha, Tokyo, Japan

[22] Filed: March 3, 1970

[21] Appl. No.: 16,167

[52] U.S. Cl. .................235/195, 235/194, 328/160
[51] Int. Cl. ...............................................G06q 7/16
[58] Field of Search.235/194, 195, 196, 193, 150.51, 235/150.52, 150.53, 150.3, 92 EL, 92 FQ, 92 TF; 324/140, 141, 142; 328/160, 161

[56] References Cited

UNITED STATES PATENTS

| 2,926,848 | 3/1960 | Gordon | 235/150.52 X |
| 3,103,578 | 9/1963 | Dietrich, Jr. | 235/150.52 X |
| 3,258,764 | 6/1966 | Muniz et al. | 235/92 EL UX |
| 3,510,772 | 5/1970 | Luthi | 324/142 |
| 3,525,042 | 8/1970 | Nunlist et al. | 324/142 |

Primary Examiner—Joseph F. Ruggiero
Attorney—Robert E. Burns and Emmanuel J. Lobato

[57] ABSTRACT

Two electrical quantities are converted to sawtoothed signals having frequencies directly or inversely proportional to their magnitudes respectively. The number of sawtoothed waves occurring in one of the signals during one period of the other signal are counted to provide a product or a quotient of the electrical quantities. Alternatively, the electrical quantities may be converted to pulse trains having repetition rates corresponding to their magnitudes and counted in terms of the number of pulses.

5 Claims, 10 Drawing Figures

PRODUCT/QUOTIENT DERIVING SYSTEM

BACKGROUND OF THE INVENTION

This invention relates to a digital system for deriving a product or a quotient of two electrical quantities.

In electric circuits it is frequently required to provide the product or quotient of two electrical quantities. For example, the electric circuits have an impedance Z, defined as a quotient of a voltage E divided by a current I, and such impedance is associated with a reactance X defined as a quotient of a reactive voltage $E_X$ divided by a current I, and an admittance Y defined as a quotient of a current I divided by a voltage E and/or an effective power P defined as a product of an active voltage $F_R$ multipled by a current I. Particularly, such products and/or quotients are essential to various measurement devices and relays. For example, the well known distance relays, proportional time delay distance relays etc., are operative in response to the magnitude of impedance or reactance, and power relays are operative in response to the magnitude of power.

In the conventional systems for deriving the product or quotient of any two electrical quantities, the practice has been, without exception, to process the quantities in an analog manner resulting in the fact that the system accuracy cannot be expected to increase beyond a predetermined limit. For example, the above-mentioned distance relays are operative merely to compare an electrical quantity, representative of the associated voltage, with another electrical quantity representative of the corresponding current in terms of magnitude and to determine whether the result of that comparison is greater or smaller than a preset value. That is, they have been incapable of quantitatively providing the particular value of impedance. This has allowed the accuracy to increase only to a certain limit. Also, such distance relays have been operative in response to the mean value of an electrical quantity due to their mechanisms, and therefore such relays have been incapable of providing the product or quotient of two instantaneous electrical quantities.

SUMMARY OF THE INVENTION

Accordingly, it is an object of the invention to provide a new and improved system for providing a product or a quotient of two electrical quantities in a digital manner and with a high degree of accuracy.

The invention accomplishes this object by the provision of a system for deriving a product or a quotient of first and second electrical quantities, comprising first circuit means for converting the first electrical quantity, into a first electrical signal having a frequency or the number in unit time of pulses corresponding to the magnitude of the first electrical quantity, second circuit means for converting the second electrical quantity into a second electrical signal having a frequency corresponding to the magnitude of the second electrical quantity, and counter means for counting the repetition frequency present in one of the first and second signals during at least the period of the other signal.

In a preferred embodiment of the invention at least one of the first and second circuit means may comprise a first transistor having a capacitor and a source of constant voltage connected in series circuit relationship across the base and emitter electrodes thereof, the source reversely biasing the first transistor; a second transistor connected across the capacitor and controlled by the first transistor; and means for applying across the capacitor through a resistor an input voltage reverse in polarity from the constant voltage, so that a charged voltage on said capacitor in excess of the constant voltage causes the first transistor to be conducting to bring the second transistor into conduction, thereby discharging the capacitor to produce a electrical signal having an sawtooth waveform and having a frequency proportional to the magnitude of the associated electrical quantity.

In the circuit means as described in the preceding paragraph, the input voltage may be exchanged with the constant voltage to produce the electrical signal of sawtoothed waveform having a frequency inversely proportional to the magnitude of the associated electrical quantity.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENTS

Figure 1A:
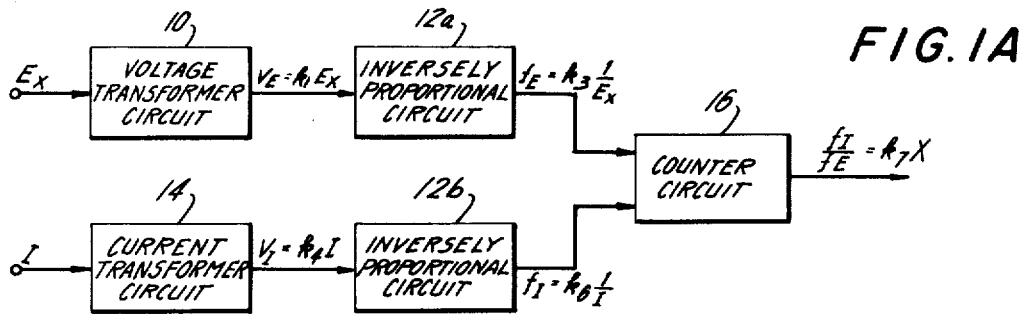
FIGS. 1A, B, C and D are block diagrams useful in explaining the principles of the invention.

Referring now to the drawings, and FIG. 1A in particular there is illustrated a circuit for deriving a reactance X as the quotient of a reactive voltage $E_X$ divided by a current I or $X = E_X/I$. The reactive voltage $E_X$ may be determined in any one of various ways well known in the art. For example, that value of a voltage E corresponding to a zero value of the associated current I provides a measure of the reactive voltage $E_X$ in alternating current circuits. The way of determining the reactive voltage forms no part of the invention and need not be herein described in detail.

The arrangement illustrated in FIG. 1A, comprises a voltage transformer circuit 10 having applied thereto a reactive voltage $E_X$ to produce a voltage $V_E$ proportional to the voltage $E_X$, that is, $V_E = k_1 E_X$ where $k_1$ is a proportional constant. The transformer circuit 10 is then connected to an inversely proportional circuit 12a for producing an electrical signal having a frequency inversely proportional to the value of the voltage $V_E$ supplied by the same. That is, the circuit 12a produces at the output the signal expressed by $$f_E = k_2 \, 1/k_1 E_X = k_3 \, 1/E_X$$

where $k_2$ and $k_3$ are proportional constants holding the relationship $$k_3 = k_2/k_1.$$

The arrangement further comprises a current transformer circuit 14 having applied thereto a current I, to produce a voltage $V_I$ proportional to the current $I$ or $V_I = k_4 I$ where $k_4$ is a proportional constant. The voltage $V_I$ is applied to an inversely proportional circuit 12b similar to the circuit 12a to form an electrical signal having a frequency inversely proportional to the value of the voltage $V_I$. That signal may be expressed by $$f_I = k_5 \, 1/V_I = k_5 \, 1/k_4 I = k_6 \, 1/I$$

where $k_5$ and $k_6$ are proportional constants holding the relationship $$k_6 = k_5/k_4.$$

Then the electrical signals from both the inversely proportional circuits 12a and b are applied to a counter circuit 16 having two inputs, one for receiving a first periodic electrical signal to be counted and the other for receiving a second periodic electrical signal controlling the period during which the first signal is counted. The output of the circuit 12a is connected to one input of the counter circuit 16 and the output of the circuit 12b is connected to the other input of the counter circuit so that the number of the periods of one of the electrical signals is counted during a predetermined number of the periods of the other electrical signal, wherein that predetermined number of the periods may have a value of one. That is, a digital quantity $$f_I/f_E = k_7 X$$

is derived from the output of the counter circuit 16 where $k_7$ is a proportional constant equal to $k_6/k_3$.

Figure 1B:
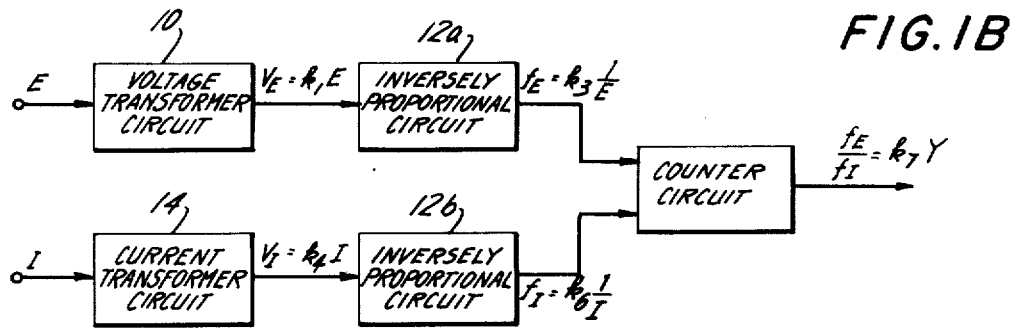

An admittance can be determined by an arrangement shown in FIG. 1B wherein like components are designated by the same reference numerals and characters. From the comparison of FIG. 1B with FIG. 1A it can be seen that instead of the reactive voltage $E_X$, a voltage $E$ is applied to the voltage transformer circuit 10 to provide a digital value $$f_E/f_I = k_7 Y$$

at the output of the counter circuit 16, as the admittance $Y$ where $k_7$ is a proportional constant equal to $k_3/k_{6a}$. In other respects the arrangement is identical to that shown in FIG. 1A.

Figure 1C:
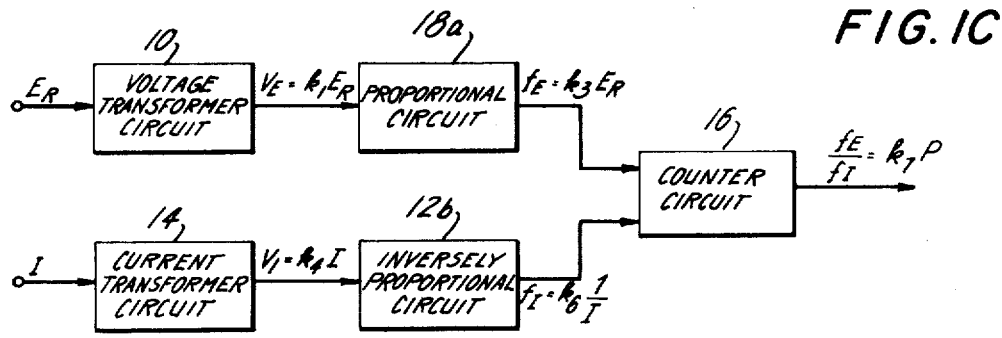
Figure 1D:
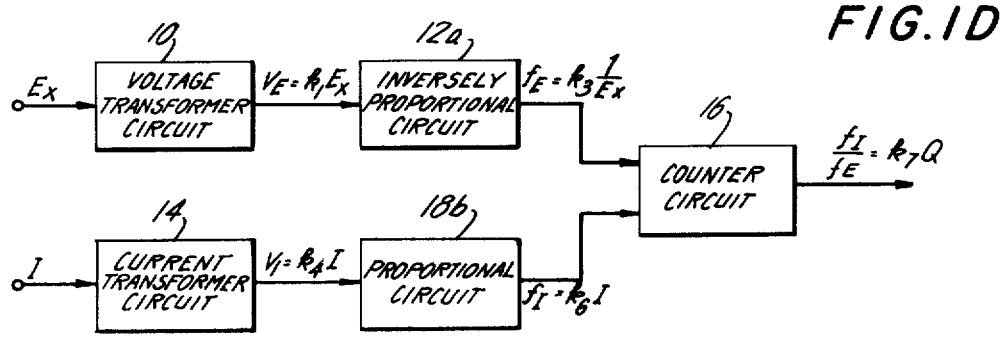

FIG. 1C illustrates an arrangement by which an effective power P is derived. The arrangement illustrated is different from that shown in FIG. 1A only in that in FIG. 1C, the voltage transformer circuit 10 is connected to a proportional circuit 18a rather than to the inversely proportional circuit 12a and has an effective voltage $E_R$ applied to the input thereof. Therefore the proportional circuit 18a produces an electrical signal $f_E = f_3 E_R$ having a frequency proportional to the value of the effective voltage $E_R$. Thus the counter circuit 16 provides a digital quantity, $$f_E/f_I = k_7 P$$

at the output as the effective power.

The effective voltage $E_R$ may be derived in any one of the well known ways. For example, it can be determined by that value of the voltage developed at an phase angle of 90° of the corresponding current. However, it is to be noted that the manner of deriving the effective voltage is not pertinent to the invention and need not be further described.

Substituting a proportional circuit 18b for the inversely proportional circuit 12b as shown in FIG. 1A permits a digital value of $$f_I/f_E = k_7 Q$$

to be derived as a reactive power. This is shown in FIG. 1C wherein like components are designated by the same reference numerals and characters, and need not be further described.

Figure 2A:
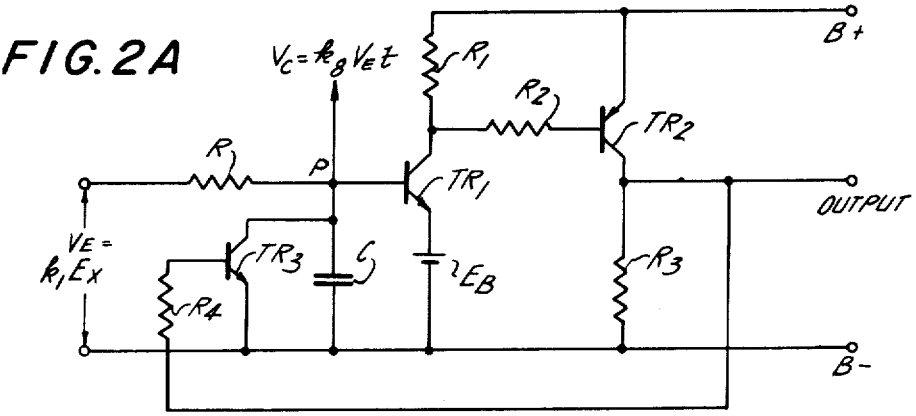
FIG. 2A is a block diagram of a proportional circuit that may be used with the invention.

Referring now to FIG. 2A, there is illustrated a preferred embodiment of the proportional circuit 18a as shown in FIG. 1C. The arrangement illustrated comprises an NPN type switching transistor $TR_1$ including a base electrode connected to a resistor R and also to a capacitor C connected to a negative bus B−; an emitter electrode connected to the negative bus B− through an input having connected thereto a source of constant voltage shown here as being a battery $E_B$; and a collector electrode connected to a positive bus B+ through a resistor $R_1$. This collector electrode is also connected through a resistor $R_2$ to a base electrode of a PNP type transistor $TR_2$ including an emitter electrode connected to the positive bus B+, and a collector electrode connected to the negative bus B− through a resistor $R_3$. The collector electrode of the transistor $TR_2$ is further connected to a resistor $R_4$ connected to a base electrode of an NPN type discharge transistor $TR_3$ which has its emitter and a collector electrodes connected across the capacitor C.

The source $E_B$ reversely biases the switching transistor $TR_1$ to normally maintain it in its nonconducting state. Also the transistors $TR_2$ and $Tr_3$ are normally maintained in their nonconducting states. The output voltage $$V_E = k_1 E_R$$

from the voltage transformer circuit 10 (see FIG. 1C) other applied across the series combination of resistor R and capacitor C through the outer input labelled "INPUT", with the voltage $V_E$ reversed in polarity from the constant voltage $E_B$ with respect to the transistor $TR_1$. Therefore the capacitor C has a voltage $$V_C = k_6 E_R t$$

charged thereon where $k_6$ is a proportional constant and $t$ is time. That voltage appears at the junction P of the resistor R and the capacitor C and corresponds to the electrical signal $$f_E = k_3 E_R$$

shown in FIG. 1C.

If the voltage $V_C$, applied to the emitter electrode of the switching transistor $TR_1$, exceeds the constant voltage $E_B$ across the source, then the transistor $TR_1$ is forwardly biased into a conducting state. The conduction of the switching transistor $TR_1$ causes the transistor $TR_2$ to conduct followed by the conduction of the discharge transistor $TR_3$. The conduction of the transistor $TR_3$ provides a discharge path for the capacitor C. Therefore the charge on the capacitor C discharges through the discharge path, or the now conducting transistor $TR_3$, until the voltage across the capacitor C becomes null. The discharge of the capacitor C is instantaneously accomplished in response to the voltage $V_r$ in excess of the voltage $E_B$. At the same time a pulse of very short duration is developed at the collector electrode of the transistor $TR_3$, and therefore at an output terminal labelled "OUTPUT", by means of a flow of current through the resistor $R_3$ for the purpose as will be apparent hereinafter.

Figure 2B:
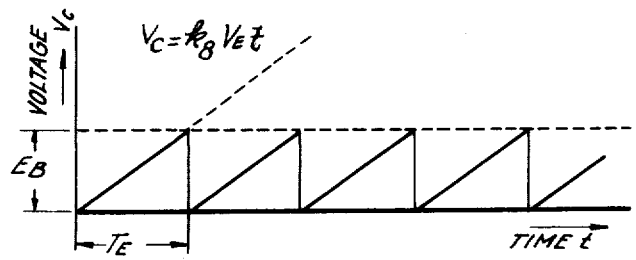
FIG. 2B is a graphic representation of a voltage waveform developed in the circuit shown in FIG. 2A.

Immediately after the capacitor C has discharged, all the transistors are put in their nonconducting states and the capacitor begins to charge to repeat the process as described above. Therefore the junction P of the resistor R and the capacitor C has developed thereat a sawtoothed signal having a slope defined by the equation $$V_C = k_8 F_R t,$$

and a period $T_E$ beginning at $V_C = 0$ and terminating $V_C = E_B$, as shown in FIG. 2B. In FIG. 2B the axis of ordinates represents the voltage $V_C$ charged on the capacitor C, and the axis of abscissas represents time whereby it can be seen that the following relationship is held:

$$k_8 E_R T_E = E_B$$

Using a frequency $f_E$ or the reciprocal of the period $T_E$ yields $$k_8 E_R \ 1/f_E = E_B$$

or $$f_E = k_8 E_R / E_B = k_3 E_R$$

where $k_3$ is a proportional constant. This means that the proportional circuit 18a provides a sawtoothed electrical signal having a repetition rate, in this case, a frequency proportional to the voltage $E_R$ applied to the input thereof.

In other words, the proportional circuit 12a is operative to compare the voltage $k_8 E_R t$, due to the input voltage with the constant voltage, $E_B$, to provide a voltage $k_8 E_R t$, at the output or the junction P when the voltage $k_8 E_R t$ is not greater than $E_B$, but to provide a zero voltage, at the junction when the voltage $k_3 E_R t$ is greater than $E_B$, with the result that a sawtoothed signal is produced at a frequency proportional to the magnitude of the input voltage.

The other proportional circuits shown in FIG. 1 may be substantially identical to the circuit 18a as above described with respect to FIGS. 2A and B.

Figure 3A:
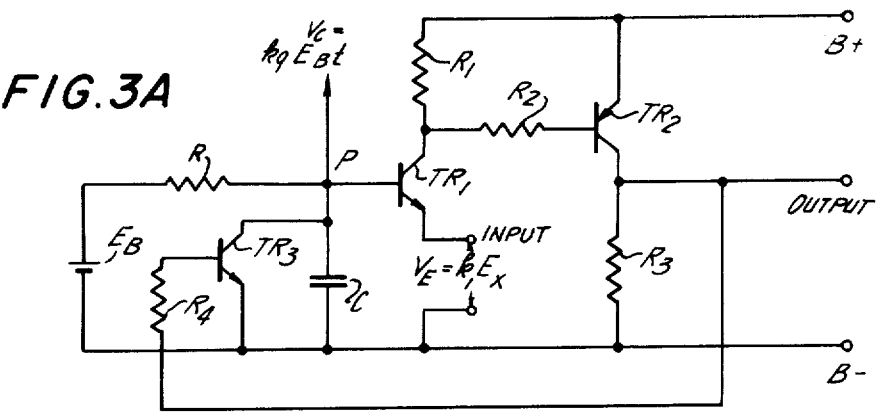
FIG. 3A is a block diagram of an inversely proportional circuit that may be used with the invention.
Figure 3B:
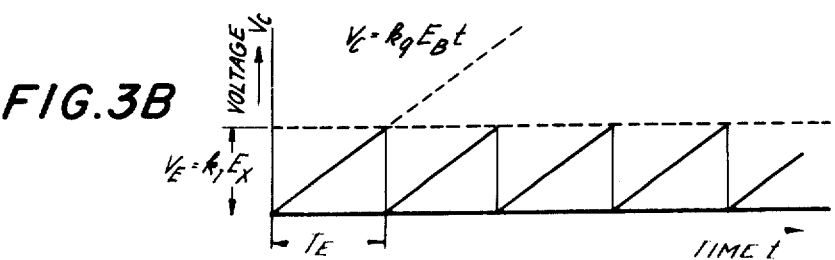
FIG. 3B is a graphic representation of a voltage waveform developed in the circuit shown in FIG. 3A.

FIG. 3A illustrates a preferred embodiment of the inverse proportionality circuit 12a as shown in FIG. 1A. The arrangement is different from that shown in FIG. 2A only in that in FIG. 3A the output voltage $$V_E = k_1 E_X$$

from the voltage transformer circuit 10 (see FIG. 1A) is applied to the emitter electrode of the switching transistor $TR_1$, while the constant voltage $E_B$ is applied across the input terminal "INPUT". Therefore the arrangement is identical in operation to that illustrated in FIG. 2A excepting that the junction P of the resistor R and the capacitor C has developed thereat a sawtoothed electrical signal having a slope defined by the equation $$V_C = k_9 E_B t$$

and a frequency $f_E$, or the reciprocal of the period $T_E$, inversely proportional to the voltage $E_X$ applied to the input, as shown in FIG. 3B. That is, the frequency $f_E$ is expressed by $$f_E = k_3 \ 1/E_X.$$

Thus, the inverse proportionality circuit 12a is operative to compare the voltage $k_1 E_X$ with the voltage $k_9 E_B t$ to provide a voltage $k_9 E_B t$ at the output or the junction P when the voltage $k_9 E_B t$ is not greater than the voltage $k_1 E_X$, but to provide a zero voltage at the junction when the voltage $k_9 E_B t$ is greater than the voltage $k_1 E_X$, with the result that a sawtoothed signal is produced at a frequency inversely proportional to the magnitude of the input voltage.

The other inverse proportionality circuits shown in FIG. 1 may be substantially identical to the circuit 12a as shown in FIG. 3A.

Figure 4:
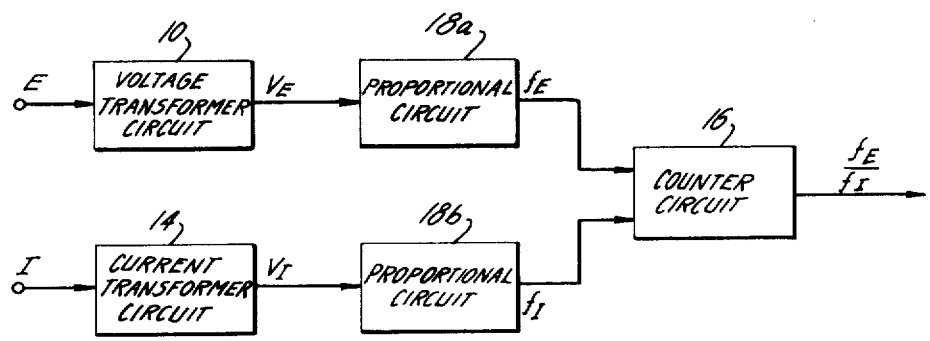
FIG. 4 is a block diagram of one embodiment of the invention.

Referring now to FIG. 4 wherein like reference numerals and characters designate the components identical to those shown in FIG. 1, there is illustrated a preferred form of the invention applied to the determination of an impedance $Z = E/I$ where $E$ and $I$ are a voltage and a current respectively for the associated circuit. The voltage E is applied to the voltage transformer circuit 10 to be transformed to a voltage $V_E$. Then the voltage $V_E$ is applied to the proportional circuit 18a, as previously described in conjunction with FIGS. 3A and B, to provide an electrical sawtoothed signal $f_E$ having a frequency proportional to the voltage $V_E$ as shown at waveform A in FIG. 5.

Figure 5:
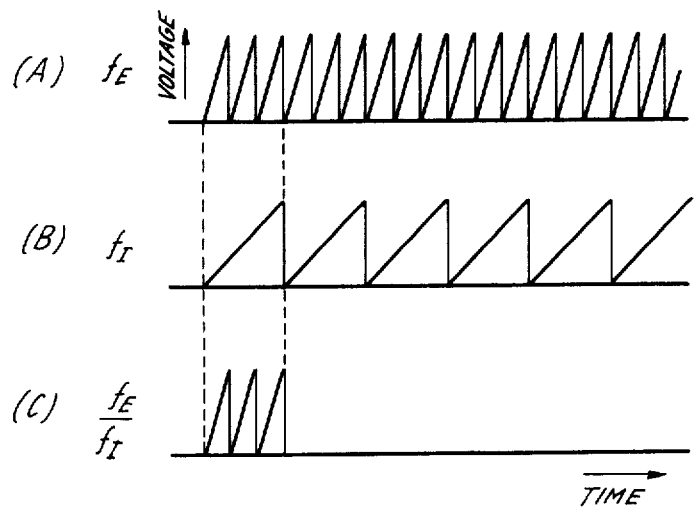
FIG. 5 is a graphic representation of various waveforms developed in the arrangement shown in FIG. 4.

On the other hand, the current I is applied to the current transformer circuit 14 to be transformed to a voltage $V_I$ which is, in turn, supplied to the proportional circuit 18b such as shown in FIG. 3A to provide an electrical sawtoothed signal $f_I$ having a repetition frequency proportional to the voltage $V_I$ as shown at waveform B in FIG. 5.

Both the signals $f_E$ and $f_I$ are applied to the counter circuit 16 where the number of the periods of one of the signals is counted during one period of the other signal. In the embodiment illustrated the number of the periods of the signal $f_E$ repeated during one period of the signal $f_I$ is three, as shown at waveform C in FIG. 5. Thus $f_E/f_I$ has been counted at three as shown at C in FIG. 5. This provides the desired value of the impedance Z or the quotient of the voltage E divided by the current I. If desired, such counting may be effected during a predetermined number of the periods of the other signal.

If the arrangement of FIG. 4 is operatively associated with means for determining if the count provided by the counter 16 is greater than a predetermined value, then there is provided an impedance relay device operative in a digital manner.

While the arrangement of FIG. 4 includes the proportional circuits such as shown in FIG. 2A, to determine the impedance or the quotient of the voltage divided by the current, it is to be apparent to those skilled in the art that inverse proportionality circuits such as shown in FIG. 3A may be substituted for the circuits shown in FIG. 4 to equally determine a quotient of two electrical signals. Alternatively, one of the proportional circuits shown in FIG. 4 may be replaced by an inverse proportionality circuit such as shown in FIG. 3A to determine a product of two electrical signals.

From the foregoing it will be appreciated that the invention provides means for deriving a product or a quotient of two electrical quantities as a countable number which is different from the prior art practice. Therefore, the invention has a variety of applications. For example, a combination of the invention with means for determining whether a count provided by the counter circuit 16 is greater or smaller than a predetermined value, provides a relay device for controlling an electric circuit. If the count itself effected by the counter circuit 16 is displayed, there is provided a measurement device capable of effecting digital indication. Furthermore, such a count can be readily transmitted to a remote point. In addition the invention is advantageous in that an increase in frequency of the electrical signal $f_E$ or $f_I$ as above described, readily leads to an increase in accuracy of measurement.

While the invention has been illustrated and described in terms of the sawtoothed signals having the frequencies corresponding to the associated electrical quantities it is to be understood that it may utilize a train of pulsed signals having a repetition rate proportional to the associated electrical quantities to determine a product or a quotient thereof. In the latter event, the pulses developed at the output terminal "OUTPUT" as shown in FIG. 2A or 3A at the end or the beginning of the sawtoothed signals as previously described, is applied to the counter circuit 16 as shown in FIG. 4. Then the counter circuit 16 counts the number of pulses in one of the signals developed during one pulse repetition period of the other signal to provide a product or a quotient as the case may be. If desired, the number of pulses in the one signal may be counted during a predetermined number of the pulse repetition periods of the other signal. Furthermore, the type of the transistors shown in FIG. 2A or 3A may be reversed from those shown, with the polarity of voltages applied to the circuit being changed.

What is claimed is:

1. A system for deriving a product or a quotient of first and second electrical quantities, comprising first circuit means for converting said first electrical quantity into a first sawtooth periodic electrical signal having a repetition rate corresponding to the magnitude of the first electrical quantity, second circuit means for converting said second electrical quantity into a second sawtooth periodic electrical signal having a repetition rate corresponding to the magnitude of the second electrical quantity and being independent of said first signal, and counter means having a first input for receiving a first periodic electrical signal to be counted and a second input for receiving a second periodic electrical signal controlling the period during which said first periodic electrical signal is counted, means connecting the output of said first circuit means to said first input of said counter means and means connecting the output of said second circuit means to said second input of said counter means to count the number of periods of said first periodic electrical signal appearing during at least one period of said second periodic electrical signal.

2. A system for deriving a product or a quotient of first and second electrical quantities comprising first circuit means for converting said first electrical quantity into a first periodic electrical signal having a repetition rate corresponding to the magnitude of the first electrical quantity, second circuit means for converting said second electrical quantity into a second periodic electrical signal having a repetition rate corresponding to the magnitude of the second electrical quantity, and counter means connected to both said first and second circuit means for counting the number of one of said first and second electrical signals appearing during at least one period of the other electrical signal, wherein at least one of said first and second circuit means comprises a first transistor, a capacitor and a source of constant voltage connected in series circuit relationship across the base and emitter electrodes of said transistor, wherein said source is connected for reversely biasing said first transistor, a second transistor having a pair of principal conducting electrodes connected in parallel with said capacitor and having a control electrode connected for biasing said second transistor into conduction in response to a conductive state of said first transistor, a resistor connected in series with said capacitor, and means for applying across said capacitor and resistor an input voltage reverse in polarity from said constant voltage, wherein a charged voltage on said capacitor in excess of said constant voltage causes said first and second transistors to conduct to discharge said capacitor, thereby to produce, in said one circuit means, the associated said periodic electrical signal having a sawtoothed waveform and having a frequency proportional to the magnitude of the input voltage.

3. A system for deriving a product or a quotient of first and second electrical quantities, comprising first circuit means for converting said first electrical quantity into a first periodic electrical signal having a repetition rate corresponding to the magnitude of the first electrical quantity, second circuit means for converting said second electrical quantity into a second periodic electrical signal having a repetition rate corresponding to the magnitude of the second electrical quantity, and counter means connected to both said first and second circuit means for counting the number of one of said first and second electrical signals appearing during at least one period of the other electrical signal, wherein at least one of said first and second circuit means comprises a first transistor, a capacitor and input voltage means connected in series circuit relationship across the base and emitter electrodes of said first transistor, wherein said input voltage means is connected for reversely biasing said first transistor, a second transistor having a pair of principal conducting electrodes connected in parallel with said capacitor and having a control electrode connected for biasing said second transistor into conduction in response to a conductive state of said first transistor, a resistor connected in series with said capacitor, and means for applying across said capacitor and resistor a constant voltage reverse in polarity from said input voltage means, wherein a charged voltage on said capacitor in excess of an input voltage of said input voltage means causes said first and second transistors to conduct to discharge said capacitor thereby to produce in said one circuit means, the associated said electrical signal having a sawtoothed waveform and having a frequency inversely proportional to he magnitude of the input voltage.

4. A system for deriving a product or a quotient of first and second electrical quantities comprising first circuit means for converting said first electrical quantity into a first periodic electrical signal having a repetition rate corresponding to the magnitude of the first electrical quantity, a second circuit means for converting said second electrical quantity into a second periodic electrical signal having a repetition rate corresponding to the magnitude of the second electrical quantity, and counter means connected to both said first and second circuit means for counting the number of one of said first and second electrical signals appearing during at least one period of the other electrical signal, wherein at least one of said first and second circuit means comprises a first transistor having an output electrode, a capacitor and a source of constant voltage connected in series circuit relationship across the base and emitter electrodes of said fist transistor, wherein said source is connected for reversely biasing said first transistor, a second transistor having an output electrode and having a control electrode connected to said output electrode of said first transistor, a third transistor having a control electrode connected to said output electrode of said second transistor and having a pair of principal conducting electrodes connected across said capacitor, and input voltage means having a voltage which is reverse in polarity from said constant voltage connected for providing a charged voltage on said capacitor in excess of said constant voltage for causing said first, second and third transistors to conduct to discharge said capacitor thereby to produce at said output electrode of said second transistor a pulsed signal having a pulse repetition rate proportional to the magnitude of the input voltage.

5. A system for deriving a product or a quotient of first and second electrical quantities comprising first circuit means for converting said first electrical quantity into a first periodic electrical signal having a repetition rate corresponding to the magnitude of the first electrical quantity, second circuit means for converting said second electrical quantity into a second periodic electrical signal having a repetition rate corresponding to the magnitude of the second electrical quantity, and counter means connected to both said first and second circuit means for counting the number of one of said first and second electrical signals appearing during at least one period of the other electrical signal, wherein at least one of said first and second circuit means comprises a first transistor having an output electrode, a capacitor and an input voltage means connected in series circuit relationship across the base and emitter electrodes of said first transistor, wherein said input voltage means is connected for reversely biasing said first transistor, a second transistor having a control electrode connected to said output electrode of said first transistor and including an output electrode, a third transistor having a control electrode connected to said output electrode of said second transistor and having a pair of principal conducting electrodes connected across said capacitor, and constant voltage means having a constant voltage reverse in polarity from said input voltage for providing a charged voltage on said capacitor in excess of said input voltage for causing said first, second and third transistors to conduct to discharge said capacitor thereby to produce at said output electrode of said second transistor a pulsed signal having a pulse repetition rate inversely proportional to the magnitude of the input voltage.

* * * * *